United States Patent [19]

Smith

[11] Patent Number: 4,920,625

[45] Date of Patent: May 1, 1990

[54] ARROWHEAD EXTRACTOR

[76] Inventor: Mark A. Smith, 408 S. 7th St., St. Clair, Mich. 48079

[21] Appl. No.: 280,128

[22] Filed: Dec. 5, 1988

[51] Int. Cl.[5] .............................................. B23P 19/04

[52] U.S. Cl. ........................................ 29/264; 29/256

[58] Field of Search ................. 29/263, 254, 256, 264; 254/20; 81/177.4, 490

[56] References Cited

U.S. PATENT DOCUMENTS

| | | | |
|---|---|---|---|
| 2,714,409 | 9/1955 | Primrose | 81/177.4 |
| 3,740,814 | 6/1973 | Marshall | 29/264 |
| 4,633,582 | 1/1987 | Ulsh | 29/264 |

*Primary Examiner*—Judy Hartman

*Attorney, Agent, or Firm*—Harness, Dickey & Pierce

[57] ABSTRACT

An arrowhead extractor apparatus for removal of an arrowhead embedded in a workpiece. The arrowhead extractor includes a threaded shaft with a threaded bore at a first end and a handle at a second end. A removable insert fits into the threaded bore. The removable insert includes a threaded bore for engaging the threaded shaft of an arrowhead. A sleeve is slideable along the shaft. The sleeve has a surface for engaging the workpiece and has a central opening through which the arrowhead can pass. An attachment is provided for adjusting the surface of the sleeve to conform to an uneven workpiece surface. A nut threadedly engages the threaded portion of the shaft. The nut engages the sleeve and moves the sleeve relative to the shaft in response to rotation of the nut.

4 Claims, 3 Drawing Sheets

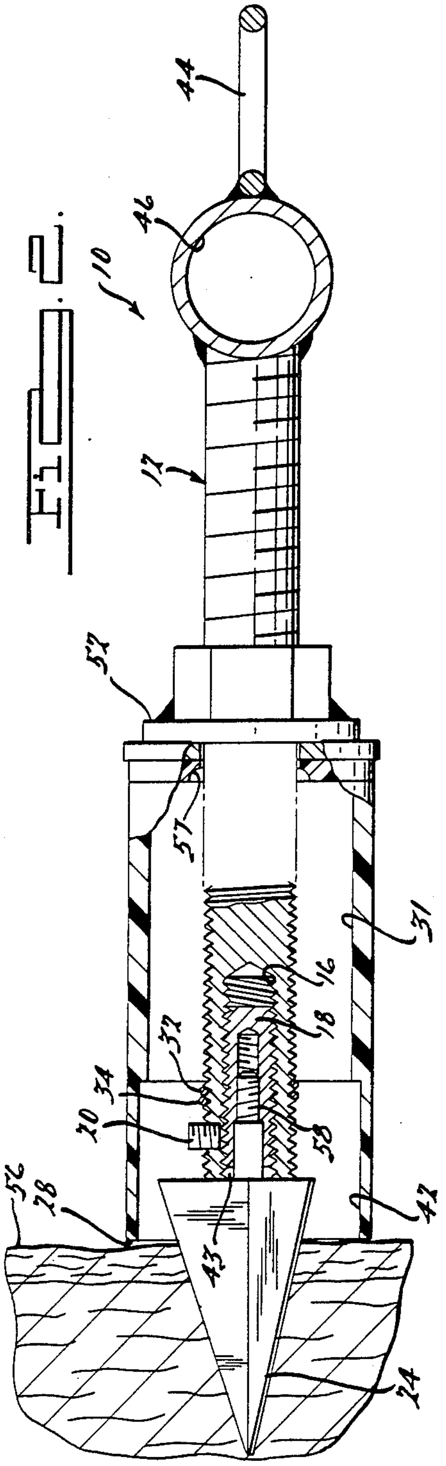
44
46
10
12
52
57
31
16
18
32
34
20
58
56
28
43
42
24
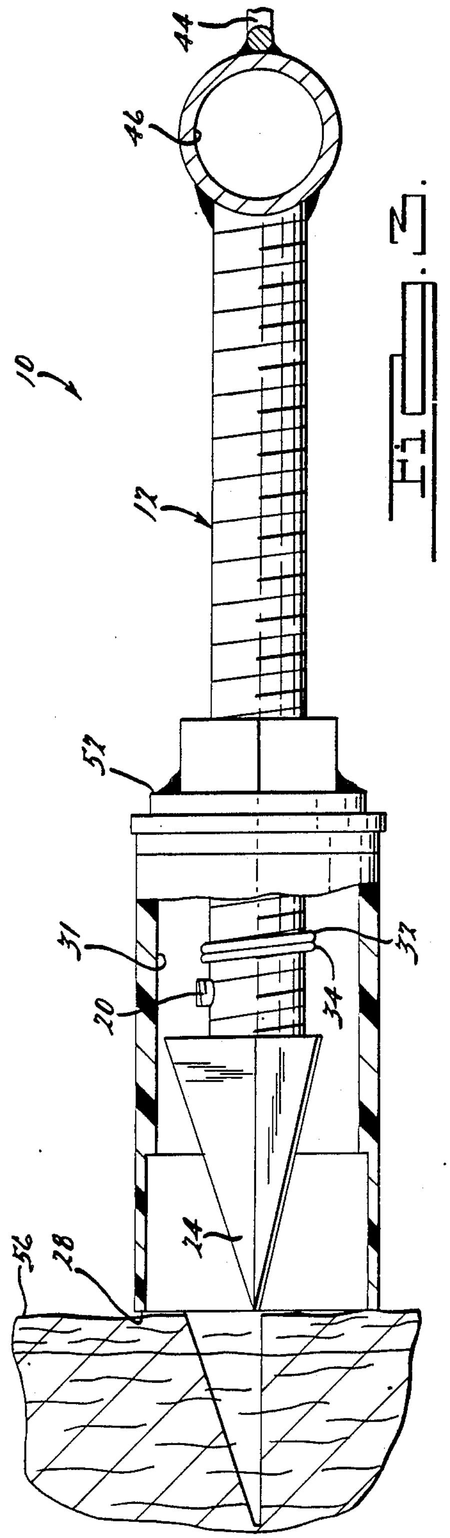
44
46
10
12
52
31
32
20
34
56
28
24

FIG. 4.
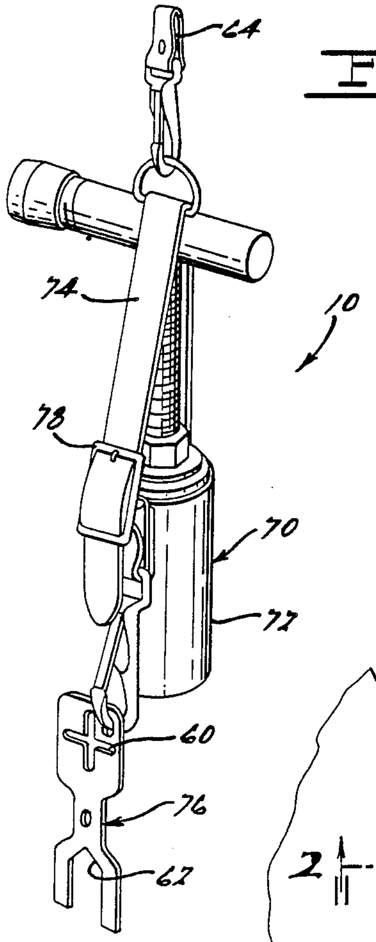
FIG. 5.
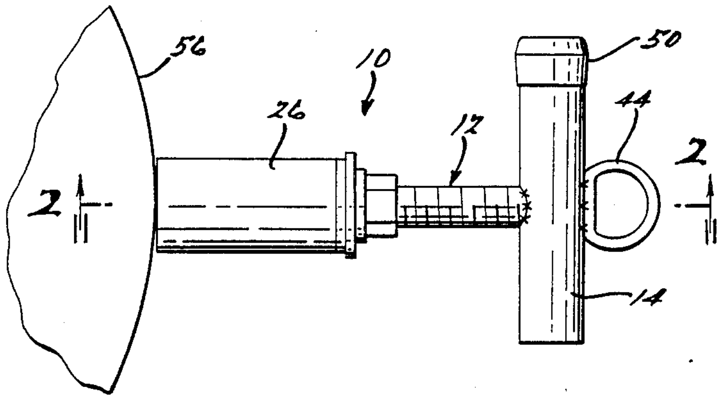
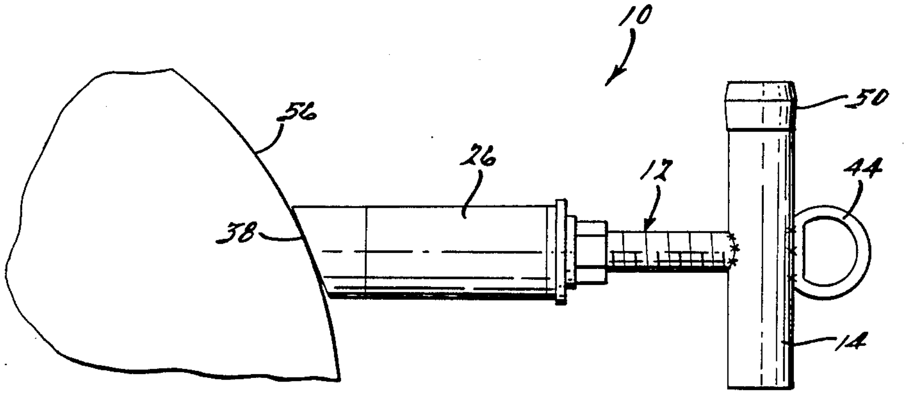
FIG. 6.

ARROWHEAD EXTRACTOR

BACKGROUND

The present invention relates to an apparatus for removal of arrowheads which have become embedded in objects.

Because of recent advancements in bow hunting technology such as the use of compound bows, new types of broadheads, new composites for use in arrowhead shafts and advanced bow sights, the sport of archery and/or bow hunting has become increasingly popular and the accuracy and velocity of arrows fired has increased dramatically in the last few years.

Modern arrows used today include a standardized threaded insert portion which is adapted to fit any of a variety of arrowheads such as field points for practice and broadheads and the like for deer hunting and other big game hunting. This provides for increased adaptability of a single set of arrows for various purposes.

Though these advancements in bow hunting have improved the accuracy and velocity of arrows fired at game and other targets in recent years, there is invariably, even for the best of archers, a missed shot. On these occasions the arrowhead will often become embedded in an unwanted object such as a tree stump or tree trunk or the like. Generally, these occurrences happen far from any readily available tools which would assist in removing the arrowhead from the unwanted target. Thus, the archer either attempts to remove the arrowhead by applying axial force on the shaft, or in some cases attempting to cam the arrowhead back and forth for loosening up its embedment in the unwanted target. On many occasions this technique either damages the arrowshaft, the broadhead or both during such removal techniques. On many occasions broadheads are occasionally left embedded in the object and abandoned at the location. Thus, it has increasingly become a need in the art to provide a portable, adaptable, relatively light and usable arrowhead remover tool to reduce these instances of lost equipment.

Several devices have been designed for such purposes. In one type of device a sturdy extension is provided which can be screwed onto the arrowhead after removal of the arrowhead shaft to give an archer or bow hunter more leverage in order to pull the arrowhead out of the object. While this may help, the problem of potential damage to the arrowhead and/or arrow shaft remains. Other apparatuses have used slide hammer arrangements by which a hammer piece is moved against an outward stop member to provide axial forces against an arrowhead in order to pull them out of a surface. An example of such devices include U.S. Pat. No. 4,387,697 to Duke; U.S. Pat. No. 4,150,469 to Hoggard; U.S. Pat. No. 4,043,020 to Hoggard; and 4,478,204 to Kocsan. While these arrow puller apparatuses are apparently functional the necessity of having a weighted end for the hammering action increases the weight and bulkiness of such devices. U.S. Pat. No. 4,194,278 to Sanders shows an apparatus for removing an arrowhead which acts to cam a sleeve against an object by means of a threaded rod to remove the arrow from the object. While this device may be effective the teachings would require various slotted pieces to be carried with the person depending on what type of arrowhead was to be removed. This also does not accommodate for possible problems in removal of the arrowhead from the device after removal from the tree or other object and additionally does not take into account or is not adjustable for uneven surfaces which are generally found in an embedded arrow such as when an arrow is embedded in the side of a tree or the like.

Therefore, it is an object of the present invention to provide an effective and light weight arrowhead pulling tool which is adaptable to many potential pulling situations found in the field. It is also an object of the present invention to provide an arrowhead pulling device which may be used with any type of arrowhead from field point to two bladed, three bladed, four bladed or even five bladed broadhead type arrowheads.

It is still further an object of the present invention to provide an arrowhead pulling apparatus which is adaptable to varying angled surfaces to provide effective removal of an arrowhead from either slanted or otherwise irregular surfaces.

It is still further an object of the present invention to provide an arrowhead pulling device which includes a storage compartment for storage of safety devices and small tools which would be useful for survival and/or purposes of operating the arrowhead pulling tool.

SUMMARY OF THE INVENTION

According to the present invention there is provided an arrowhead extractor for removal of an arrowhead which is embedded in an object. The arrowhead which is removed by the present invention has a threaded shaft on the nonembedded side. The extractor comprises a shaft portion having surfaces defining a bore at a first end and a handle portion at a second end thereof. Portions of the shaft between the first end and the second end are externally threaded. A removable insert is provided for attachment to the arrowhead shaft portion. The bore of the shaft portion includes a means for releasably engaging the insert. A sleeve portion is provided which has a surface for engaging the object. The sleeve portion is configured about the shaft and slideable on the shaft along the length thereof. The sleeve portion has a central opening through which the outer most portions of an arrowhead can pass. A means for adjusting the surface of the sleeve portion to conform to an uneven workpiece surface is provided. Nut means are also provided for engaging the threaded portion of the shaft and engaging the sleeve portion of the shaft for moving the sleeve portion in the direction toward and over the first end of the shaft in response to rotation of the nut means.

In operation, the threaded bore in the insert securely engages the threaded shaft of the arrowhead and the surface of the sleeve engages the workpiece. Rotation of the nut provides relative movement between the shaft and the sleeve thus pulling the shaft, insert and arrowhead away from the object thereby removing the arrowhead from the object.

Additional benefits and advantages of the present invention will become apparent form the subsequent description of the preferred embodiments and the appended claims taking conjunction with the accompanying drawings.

BRIEF DESCRIPTION OF THE DRAWINGS

FIG. 2 is a sectional view of the present invention showing the extractor in position for extraction of an embedded arrowhead;

FIG. 3 is a sectional view showing the extraction of an arrowhead;

FIG. 4 is a perspective overall view of the arrowhead extractor of the present invention and the holster for storing and transporting of the arrowhead extractor into the field;

FIG. 5 is a planar view showing the use of the present invention when an arrowhead is embedded on the side of a tree;

FIG. 6 is a planar view of the present invention showing the use of the sleeve attachment for adapting the present invention for removal of arrows embedded in a nonperpendicular manner in the side of a tree or other angled surface.

DESCRIPTION OF THE PREFERRED EMBODIMENT

Figure 1:
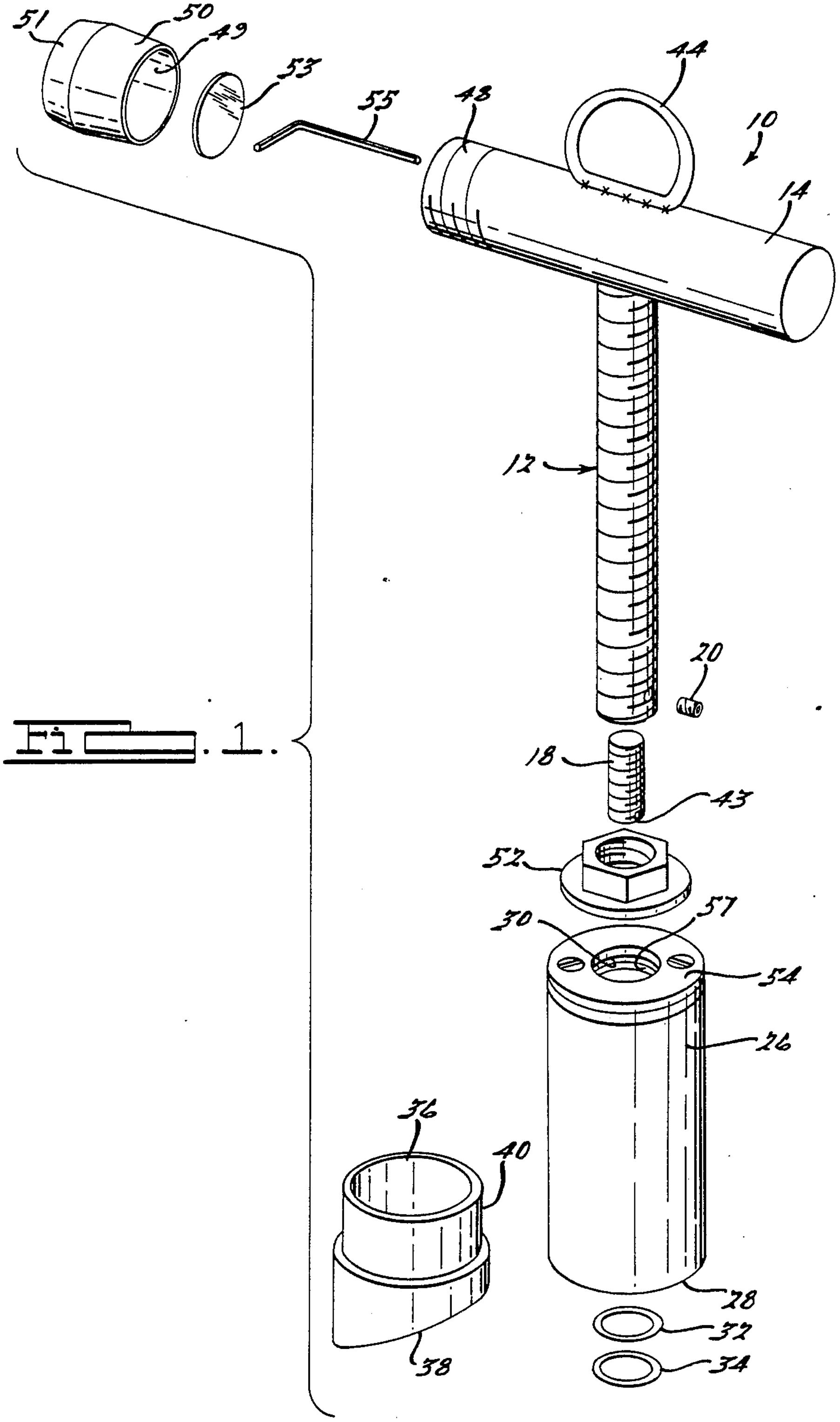
FIG. 1 is exploded perspective view of the arrowhead extraction of the present invention.

According to the present invention an arrowhead extractor apparatus generally shown at 10 is provided. The arrowhead extractor apparatus of the present invention includes a shaft portion 12 which includes a transversely mounted handle 14 at a first end and has a threaded bore 16 therein (as shown in FIG. 2) at a second end. A removable insert is provided which includes external threads which may be releasably threaded into the bore threads 16. Set screw 20 acts to lock the insert 18 in position. The insert 18 includes portions defining a threaded bore 22. Bore 22 is adapted to receive the standardized threads of a broadhead or other arrowhead 24. The insert also includes a slot 43 which may be engaged by a suitable screwdriver for removal of the insert 18.

A sleeve member 26 is provided. The sleeve member 26 has a surface for engaging a workpiece 28 and is configured about the shaft and slideable thereon by way of the bore 30. The sleeve member 26 also has a wider central bore 31 which is wider than the blades of a broadhead arrowhead. '0' rings 32 and 34 are provided on the threaded portion of the shaft to prevent the sleeve 26 from sliding off the shaft at the second end. A recess 57 is provided for engagement of the '0' rings to reduce the propensity for making noise by rattling of the sleeve 26 when preparing for arrowhead extraction.

A means for adjusting the surface of the sleeve to adapt to an uneven workpiece surface in the form of attachment 36 is also provided in the present invention. The attachment 36 includes a slanted surface 38. The attachment 36 has a connection portion 40 which is of a mating diameter which fits in the concentrically larger portion 40 of the sleeve 26.

A 'C' ring 44 is provided on the handle 14 for purposes of storage and/or handling of the apparatus 10.

Handle 14 includes a central storage compartment 46 and has a threaded end 48 for sealing of the storage compartment 46 by way of cap 50. Cap 50 in a preferred embodiment includes a compass 51 on the outer most portion and a signal mirror 53 is advantageously placed in the terminal end of the threaded bore 49. The central storage compartment may store any of a number of tools or survival implements such as hexagonal wrench 55 for tightening set screw 20.

A nut means 52 threadedly engages the shaft portion between the handle and the upper part of the sleeve for creating relative movement between the shaft portion 12 and the sleeve 26 in response to rotation of the nut means 52. A reinforced washer portion 54 is provided on the sleeve 26 for assisting in the distribution of forces applied against the sleeve 26.

Referring now to FIG. 2 arrowhead 24 is shown embedded in workpiece 56 which may be a tree stump, tree trunk or other obstruction which became the unintended resting place of the arrowhead. The arrowhead 24 includes a threaded shaft 58. The threaded shaft 58 is normally engaged in an appropriate bore of an arrow shaft, however, for purposes of operation of the arrowhead extractor the arrow shaft must be removed prior to attachment of the arrowhead extractor of the present invention. In operation the insert 18 is threadedly engaged with the bore 16 of shaft 12. The set screw is thereafter tightened to hold the threaded insert in position to prevent rotation or other movement of insert 18. The shaft portion 12 is then rotated by way of handle 14 to engage the threaded shaft 58 in the bore 22 of insert 18. Thereafter, the nut 52 is moved to force the sleeve 26 downward over the arrowhead to engage the workpiece surface 56. Using a wrench or other means the nut is thereafter continued to rotate in the same direction for pressing the sleeve against workpiece surface 56 and thus pulling the arrowhead 24 by way of shaft 12 upward and away from the workpiece surface 56. At this point in time the arrowhead may be removed from the workpiece by either unscrewing it by hand or by using a wrench to remove the arrowhead from the shaft.

It has been a problem that with arrowhead extractors of the past upon attempting removal the arrowhead shaft may in fact break off in the bore by which it is engaged. This has been a problem in the past in that either the arrowhead shaft would have to be removed by boring or other operation which creates undue time and tool demands, or may require other costly replacements of parts of arrowhead extractors. Insert 18 provides a method that should this shaft break off in the insert the tool need not be discarded or otherwise repaired but the insert may be easily removed from the shaft 12 by loosening the set screw and merely unscrewing same. Thereafter, a second insert can be easily inserted into the shaft portion 12 and the arrowhead extractor may be reused thereby.

As shown in FIG. 4 a holster 70 may be used with the present invention for transportation of the extractor apparatus. Holster 70 includes a holster portion 72 having a strap 74 for securing the arrowhead extractor 10 in the holster 70. A tool 76 may also be provided which includes an arrowhead wrench portion 60 and a wrench portion 62 for engaging the nut 52. These may be releasably secured to the holster 70 such that a complete system for removal is provided. A holster belt clip 64 is also provided for easy portability of the arrowhead extractor.

In operation, the device may be placed in the holster portion 72 with the handle in an upward direction. The strap is placed through the 'D' ring and secured at the buckle 78. Thereafter, the nut 52 may be adjusted so to extend the handle 14 in relation to sleeve 26 thereby tightening the apparatus in the holster to prevent unwanted rattling of the device.

An apparatus made in accordance with the teachings of the present invention is shown in FIGS. 5 and 6. With the attachment attached thereto (as shown in FIG. 6) should the arrowhead be embedded at an angle to a workpiece surface such as a long stub or tree trunk the attachment may be placed on the arrowhead extractor to facilitate removal even at angles. Of course, various attachments at various angles may be provided to create infinitely adjustable surface or arrowhead angles. With the attachment removed as shown in FIG. 5 the arrowhead extractor may be advantageously used on arrowheads which are perpendicular to the work surface.

While the above description constitutes the preferred embodiment of the present invention, it would be appreciated that the invention is susceptible to modification, variation and change without departing from the proper scope and fear meaning of the accompanying claims.

What is claimed is:

1. An arrowhead extractor apparatus for removal of an arrowhead which is embedded in a workpiece having a work surface, said arrowhead having a threaded shaft on the non-embedded side, said extractor comprising:

a shaft portion having surfaces defining a bore at a first end thereof, a handle portion at a second end and portions of said shaft being externally threaded therebetween;

a removable insert for attachment to an arrow head shaft portion, said surfaces defining said bore including means for releasably engaging said insert, said insert being selectively removable for replacement with another line insert should the insert become unusable means for facilitating removal of said insert including slot means on an exposed end thereof for receiving a rotational drive tool, and means for locking said insert within the shaft including a set screw extending transversely through a portion of said shaft to frictionally engage said insert;

a sleeve portion having a surface for engaging a work surface configured about said shaft and slideable thereon along the length of said shaft, said sleeve portion having a central opening through which the arrowhead can pass;

a means for adjusting the surface of said sleeve portion to conform to an uneven work surface;

nut means for threadedly engaging said threaded portion of said shaft, said nut means for engaging said sleeve portion and moving said sleeve portion in a direction toward and over said first end of said shaft in response to rotation of said nut means, wherein said insert securely engages the threaded shaft of an arrowhead said sleeve engages the work surface, and said rotation of said nut pulls said shaft, said insert and said arrowhead away from said work surface thereby removing said arrowhead from the work surface.

2. The tool of claim 1 wherein said means for adjusting said surface includes a separable sleeve attachment having a slanted work surface for engaging the work surface, said sleeve portion defining a surface perpendicular to said shaft with said attachment removed and defining a slanted engaging surface with said attachment attached.

3. The tool of claim 1 wherein said handle has a sealable bore therein for defining a storage space for containing survival implements therein.

4. An arrowhead extractor apparatus for removal of an arrowhead which is imbedded in a workpiece having a work surface, said arrowhead having a threaded shaft on the non-embedded side, said extractor comprising:

a shaft portion having surfaces defining a threaded bore at a first end thereof, a handle portion at a second end of said shaft portion, said handle including a sealable storage cavity therein for storage of tools or survival implements therein, portions of said shaft being threaded between said handle and said first end;

a removable insert, externally threaded for removable threaded engagement in said threaded bore of said shaft, said removable shaft having a threaded bore for engaging the threaded shaft of said arrowhead and a screwdriver slot on an end thereof for facilitating removal of said insert from said slot;

a set screw for locking said insert into said shaft;

a sleeve portion having a first surface for engaging a work surface, said sleeve portion being configured about said shaft and slideable thereon along the length of said shaft, said sleeve portion having a central opening through which the arrowhead can pass, said sleeve portion including a counterbore therein in said central opening adjacent said surface of said sleeve portion;

a separate attachment having a male portion for removably engaging said counterbore and being adjustably positioned in said counterbore, said attachment being removably inserted into said sleeve portion for adapting said extractor for use with an uneven work surface; and a nut means for threadedly engaging said threaded portion of said shaft and for engaging said sleeve portion to provide relative movement between said shaft portion and said sleeve portion in response to rotation of said nut means, and for providing engagement of said first surface or said slanted surface with said work surface when said insert is engaging the threaded a shaft of an arrowhead, and said relative movement operatively pulling said arrowhead from said work surface.

* * * * *